US012748557B2

(12) United States Patent
Han et al.

(10) Patent No.: US 12,748,557 B2
(45) Date of Patent: Sep. 29, 2026

(54) METHOD AND APPARATUS FOR IMPROVING MEMORY BANDWIDTH WHILE MEETING QOS BY MANAGING QUEUE SPACE

(71) Applicant: Samsung Electronics Co., Ltd., Gyeonggi-do (KR)

(72) Inventors: Miseon Han, San Jose, CA (US); Engin Ipek, San Diego, CA (US); Li Zhao, Saratoga, CA (US); Xiaochen Guo, Los Angeles, CA (US); Keshav Raheja, Austin, TX (US)

(73) Assignee: Samsung Electronics Co., Ltd. (KR)

( * ) Notice: Subject to any disclaimer, the term of this patent is extended or adjusted under 35 U.S.C. 154(b) by 13 days.

(21) Appl. No.: 19/080,335

(22) Filed: Mar. 14, 2025

(65) Prior Publication Data

US 2026/0111147 A1 Apr. 23, 2026

Related U.S. Application Data

(60) Provisional application No. 63/709,172, filed on Oct. 18, 2024.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ..... G06F 3/0659; G06F 3/0604; G06F 3/0673
See application file for complete search history.

(56) References Cited

U.S. PATENT DOCUMENTS

| | | | | |
|---|---|---|---|---|
| 7,245,626 | B1 * | 7/2007 | Sindhu | H04L 47/522 370/468 |
| 7,852,867 | B2 | 12/2010 | Tsang et al. | |
| 8,365,015 | B1 | 1/2013 | Yu et al. | |
| 8,539,094 | B1 * | 9/2013 | Marr | H04L 47/125 709/201 |
| 9,361,240 | B2 | 6/2016 | Goodman et al. | |
| 11,675,659 | B2 | 6/2023 | Magro et al. | |
| 2005/0262263 | A1 | 11/2005 | Hathaway et al. | |
| 2014/0036680 | A1 * | 2/2014 | Lih | H04L 47/12 370/235 |
| 2014/0244920 | A1 | 8/2014 | Biswas et al. | |
| 2015/0078158 | A1 * | 3/2015 | Boddu | H04L 47/31 370/230 |
| 2019/0205244 | A1 | 7/2019 | Smith | |
| 2022/0012140 | A1 | 1/2022 | Das Sharma et al. | |
| 2024/0048489 | A1 * | 2/2024 | Kadosh | H04L 47/12 |

* cited by examiner

*Primary Examiner* — Janice M. Girouard
(74) *Attorney, Agent, or Firm* — The Farrell Law Firm, P.C.

(57) ABSTRACT

A system and a method are disclosed for managing memory requests in a memory controller. The method includes storing a memory request in a request queue, the request queue comprising one or more request slots; determining if the memory request in the request queue is oversubscribed to a dedicated number of the request slots of a first information processor (IP); and copying the memory request from the request queue to a replay buffer comprising one or more replay slots in a case in which the memory request is oversubscribed to the first IP.

20 Claims, 8 Drawing Sheets

METHOD AND APPARATUS FOR IMPROVING MEMORY BANDWIDTH WHILE MEETING QOS BY MANAGING QUEUE SPACE

CROSS-REFERENCE TO RELATED APPLICATION

This application claims the priority benefit under 35 U.S.C. § 119(e) of U.S. Provisional Application No. 63/709,172, filed on Oct. 18, 2024, the entire contents of which are incorporated herein by reference.

TECHNICAL FIELD

The disclosure generally relates to memory controllers (MCs) and techniques for managing memory request queues in computing systems. More particularly, the subject matter disclosed herein relates to improving memory bandwidth utilization and ensuring quality of service (QoS) in systems with multiple information processors (IPs), specifically through the introduction of a replay buffer and dynamic queue management strategies to optimize request handling and scheduling efficiency.

SUMMARY

Recent applications such as artificial intelligence (AI) and real-time multimedia processing increase demand for use of multiple IPs and high memory bandwidth in modern computing systems.

In multiple IP systems, each IP might have different requirements such as high memory bandwidth or short latency. To guarantee these requirements are met, MCs might allow a fixed number of request queue entries to each IP, which is for QoS management. However, one issue with these approaches is that they do not efficiently manage the allocation of unused queue entries among IPs, leading to underutilization of available memory bandwidth.

Also, to achieve high memory bandwidth, prior solutions have aimed to increase request queue size by attempting to pick better requests by utilizing out-of-order scheduling. However, this approach introduces unnecessary hardware complexity, thereby limiting its practical effectiveness.

To overcome these issues, systems and methods are described herein for implementing a replay buffer-based dynamic queue management strategy. This disclosure introduces a replay buffer to temporarily store requests from IPs that demand more entries than their allowance, allowing their reallocation when queue space becomes available. The system can dynamically monitor queue usage and permit requests from underutilized IPs to overwrite older requests from oversubscribed IPs in the main queue. The replay buffer may ensure that overwritten requests are not lost and can be replayed at a later time, thereby maximizing bandwidth utilization while maintaining QoS.

The above approaches improve on previous methods by enabling higher queue utilization, ensuring QoS compliance, and reducing hardware complexity compared to traditional solutions. This leads to improved memory bandwidth efficiency and better performance for bandwidth-critical and latency-sensitive applications.

According to an aspect of the disclosure, an MC includes a request queue comprising one or more request slots; a replay buffer comprising one or more replay slots; and circuitry. The circuitry is configured to determine if a memory request in the request queue is oversubscribed to a dedicated number of the request slots of a first IP, and copy the memory request from the request queue to the replay buffer in a case in which the memory request is oversubscribed to the first IP.

According to another aspect of the disclosure, a method for managing memory requests in an MC is provided. The method includes storing a memory request in a request queue, the request queue comprising one or more request slots; determining if the memory request in the request queue is oversubscribed to a dedicated number of the request slots of a first IP; and copying the memory request from the request queue to a replay buffer comprising one or more replay slots in a case in which the memory request is oversubscribed to the first IP.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1B:
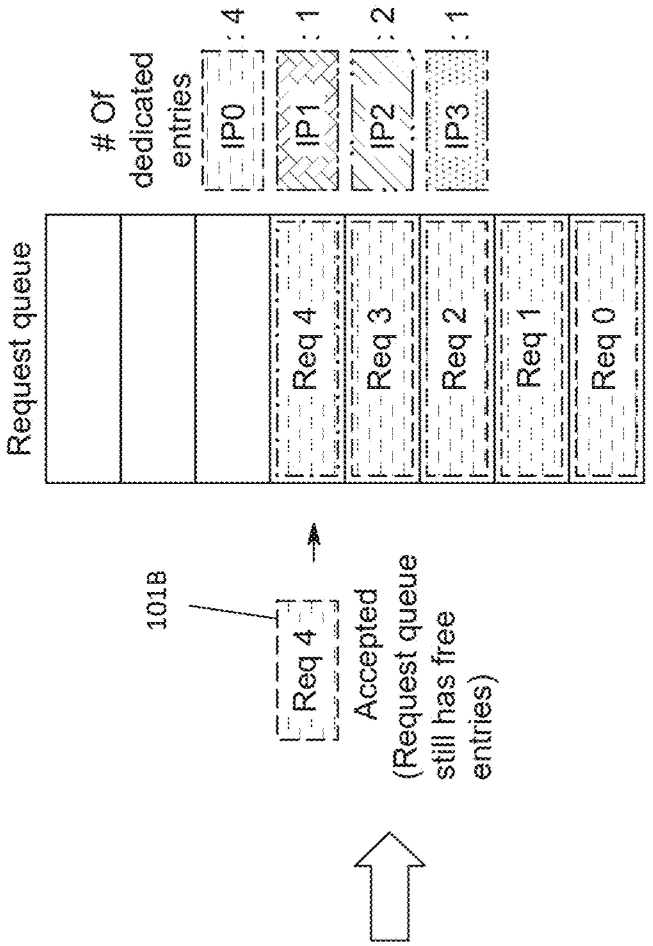
FIGS. 1A-1B are diagrams illustrating a request queue having a dedicated number of entries per IP, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration."

Any embodiment described herein as "exemplary" is not to be construed as necessarily preferred or advantageous over other embodiments. Additionally, the particular features, structures, or characteristics may be combined in any suitable manner in one or more embodiments. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

"Request queue" as used herein refers to a memory structure configured to temporarily store memory requests before they are executed by a memory. Some examples of "request queue" are read request queues and write request queues that allocate dedicated portions to IPs.

"Request slot" as used herein refers to an individual entry or space within a request queue allocated for storing a single memory request. Some examples of "request slot" are entries assigned to specific IPs, such as slots for latency-sensitive or high-bandwidth traffic.

"Memory request" as used herein refers to an operation initiated by an IP block that requests access to system memory. Some examples of "memory request" are read requests, write requests, and similar operations generated by processors, GPUs, or other IPs.

"Replay buffer" as used herein refers to a memory structure configured to temporarily store memory requests that cannot be processed in the request queue due to oversubscription. Some examples of "replay buffer" are small buffers implemented as content-addressable memory (CAM) for efficiently managing oversubscribed requests from IPs.

"Replay slot" as used herein refers to an individual entry or space within a replay buffer allocated for storing a single memory request. Some examples of "replay slot" are entries used to temporarily hold oversubscribed memory requests from IPs or requests awaiting reintroduction into the request queue.

"Oversubscribed" as used herein refers to a condition in which the number of memory requests associated with an IP exceeds the dedicated portion of the request queue allocated to that IP. Some examples of "oversubscribed" are when IPs with high bandwidth requirements attempt to queue up more requests than their allocated slots allow.

"Duplicated bit" as used herein refers to a marker or flag associated with a memory request in a replay buffer to indicate that the request has already been copied from the request queue. Some examples of "duplicated bit" are binary flags used in the replay buffer to prevent redundant scheduling of requests that already exist in the request queue.

"QoS" as used herein refers to quality of service, which is the ability of a system or component to manage resources and prioritize tasks to meet specific performance requirements, such as latency, bandwidth, or reliability. Some examples of "QoS" are ensuring low latency for real-time multimedia tasks, allocating sufficient bandwidth to high-throughput operations.

Memory bandwidth is a performance bottleneck in modern computing systems. Achieving high bandwidth utilization is particularly challenging due to the stringent timing constraints imposed by dynamic random access memory (DRAM) technology. One approach to improve bandwidth utilization would be the use of deep request queues to increase the possibility of picking more optimal memory requests to improve bandwidth utilization and efficiency from the queue by leveraging of out-of-order request scheduling. However, increasing the size of these queues may not be a viable option as they can significantly increase hardware complexity, complicate register-transfer level (RTL) timing, and lead to higher queuing latencies, ultimately degrading overall memory performance.

In some systems, IPs, such as central processing units (CPUs), graphic processing units (GPUs), natural language processing units (NPUs), multimedia engines, and modems, have unique performance requirements, including specific bandwidth or latency guarantees.

An MC manages interactions between various IPs and system memory, such as DRAM. IPs generate memory access requests, each with specific performance needs like low latency or high bandwidth. To handle these requests efficiently while meeting QoS requirements, the MC may have a fixed (dedicated) number of request queue entries per IP (e.g., an IP with a high bandwidth requirement has more fixed entries). However, this static allocation often leads to inefficiencies. If an IP's allocated queue entries are idle, those resources may remain unused, even if other IPs need additional space. On the other hand, when an IP wants to send new requests while its allowed entries are full, new requests may be rejected, even if other IPs have unused capacity.

Figure 1A:
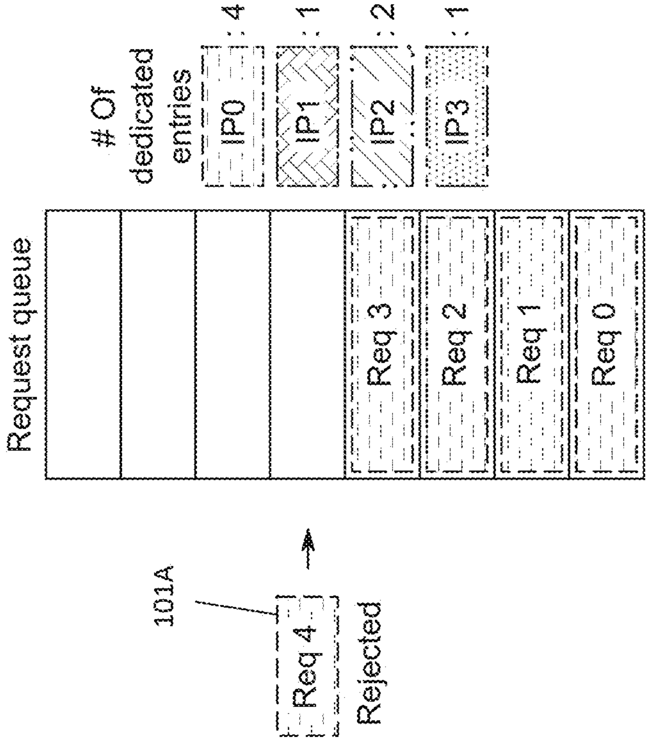

FIGS. 1A-1B are diagrams illustrating a request queue having a dedicated number of entries per IP, according to an embodiment.

Referring to FIG. 1A, each IP is allocated a dedicated number of request queue entries to ensure that the needs of latency-sensitive or real-time traffic are met. For example, IP0 has 4 entries, IP1 has 1 entry, IP2 has 2 entries and IP3 has 1 entry. However, this static allocation often leads to inefficiencies: if an IP has no available request slots, request queue slots remain idle and unusable by other traffic, wasting valuable resources. As shown in FIG. 1A, request 101A is rejected because the number of dedicated entries for IP0 in the request queue is set to 4, and 4 IP0 requests already exist in the request queue.

The present disclosure addresses these limitations by proposing a mechanism that dynamically reallocates unused queue resources while maintaining strict QoS guarantees. This mechanism overcomes the inefficiencies of static queue allocation and ensures that MCs can better handle the increasing bandwidth demands of modern computing workloads.

Referring to FIG. 1B, each IP is allocated a dedicated number of request entries similar to FIG. 1A, however, even if the request queue already includes 4 entries for IP0 (its maximum allocated amount), the system may identify that the request queue still has free entries in other IPs besides IP0. Therefore, the request 101B may be allocated to the queue be exceeding the number of dedicated entries.

Accordingly, as suggested by FIG. 1B, in order to more efficiently use the bandwidth of the request queue, the present disclosure introduces a system and method that applies a replay buffer to manage requests to improve utilization of the request queue. A replay buffer is a small, additional memory structure that temporarily holds requests from oversubscribed IPs when their dedicated portion of the request queue is full. The replay buffer operates without expanding the request queue itself.

The replay buffer allows unused resources from underutilized IPs to be dynamically reallocated to handle requests from oversubscribed IPs. When space becomes available in the request queue, requests stored in the replay buffer can be reintroduced for scheduling. This approach optimizes bandwidth utilization by ensuring that no queue entries are wasted, while maintaining the original size of the request queue.

Figure 2A:
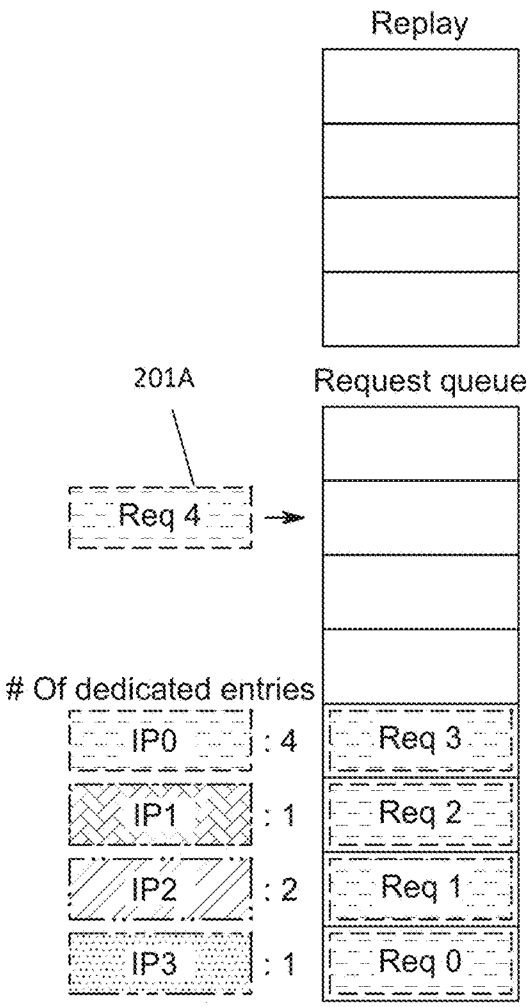
FIGS. 2A-2B are diagrams illustrating the operation of a request queue and a replay buffer when the request queue is not yet full, according to an embodiment.
Figure 2B:
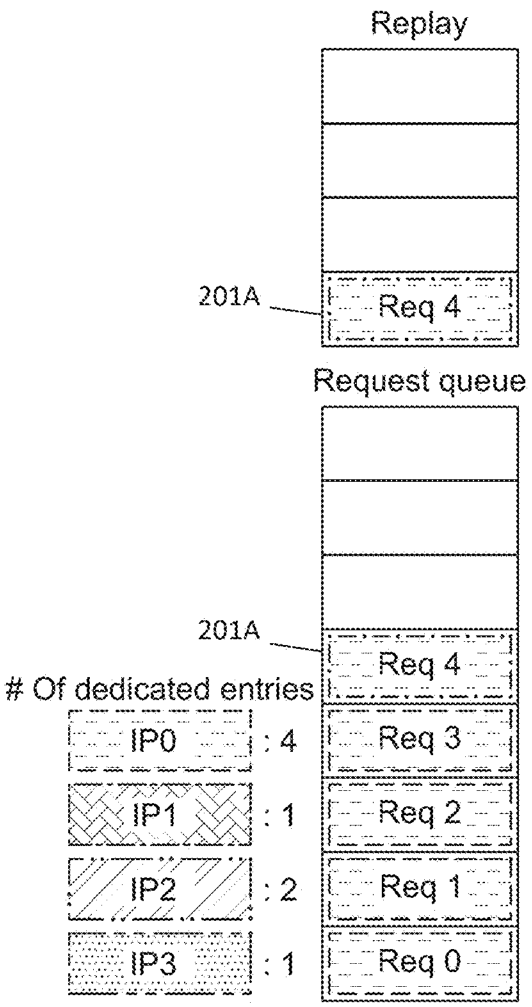

FIGS. 2A-2B are diagrams illustrating the operation of a request queue and a replay buffer when the request queue is not yet full, according to an embodiment.

Referring to FIG. 2A, the request queue is shown as holding four requests, leaving four entries (request slots) available. Each IP has a dedicated number of entries, with IP0 allocated 4, IP1 allocated 1, IP2 allocated 2, and IP3 allocated 1. An additional request 201A (Req 4) associated with IP0 is received by the MC. Since IP0 is already occupying its maximum allowed portion of the queue (four entries) in FIG. 2A, accepting the new request directly would exceed the IP0 allocation and potentially violate QoS constraints.

As shown in FIG. 2B, the system accepts Req 4 into the request queue while simultaneously copying it into the replay buffer. This ensures that the request is retained for future use without immediately affecting the QoS distribution of other IPs. By copying the incoming request to the replay buffer, the system maintains flexibility to manage resources dynamically if future requests from undersubscribed IPs arrive. This mechanism enables the MC to handle additional requests while still adhering to the defined QoS requirements for each IP.

Figure 3A:
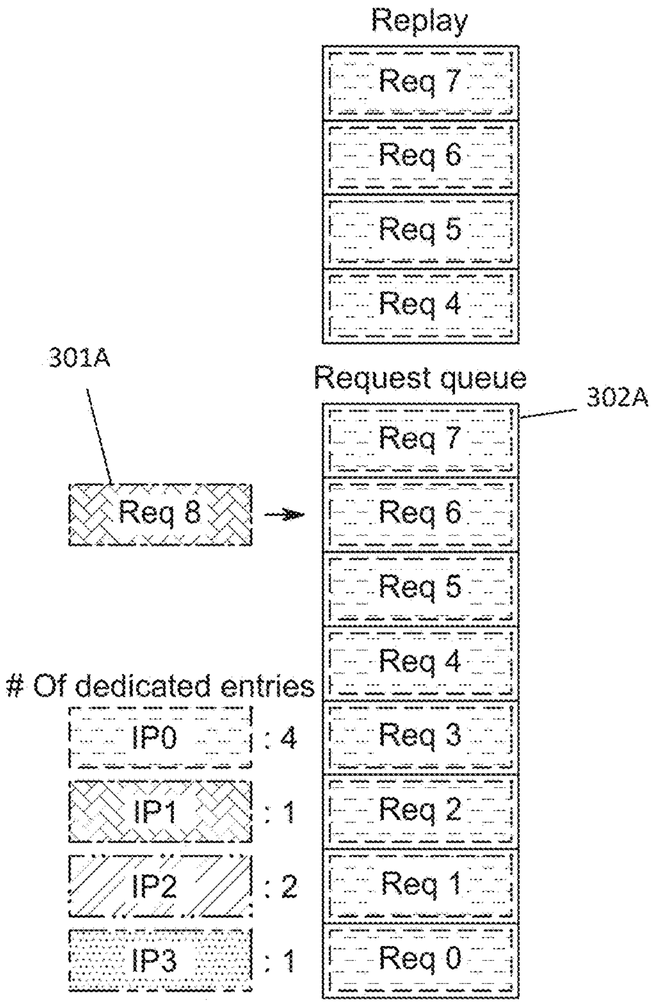
FIGS. 3A-3B are diagrams illustrating the operation of a request queue and a replay buffer when the request queue is full, according to an embodiment.
Figure 3B:
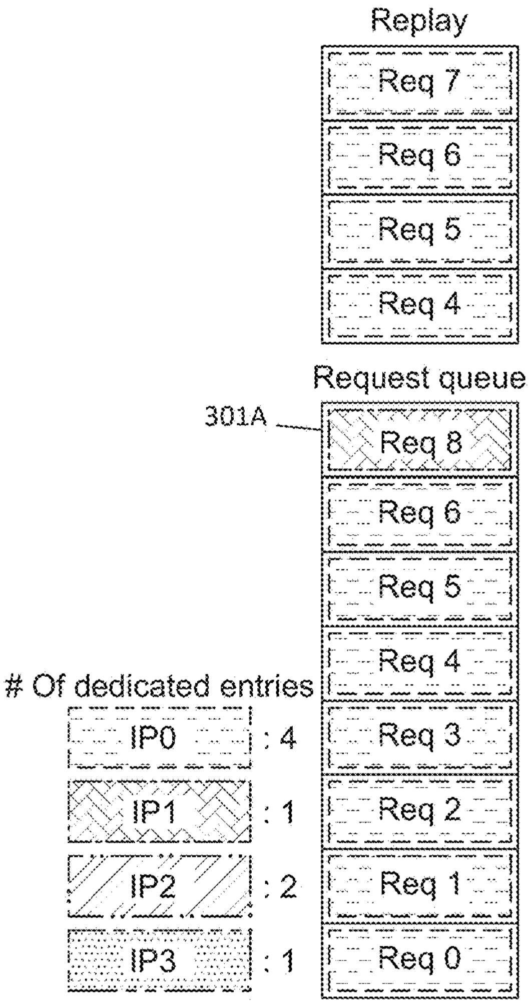

FIGS. 3A-3B are diagrams illustrating the operation of a request queue and a replay buffer when the request queue is full, according to an embodiment.

Referring to FIG. 3A, the request queue has reached its capacity, with all entries fully occupied. In this example, the IP configuration allocates 4 dedicated entries to IP0, 1 to IP1, 2 to IP2, and 1 to IP3. An additional request 301A (Req 8) associated with IP1 arrives at the MC. However, since the request queue is already full, the system must determine how to handle this new request without violating QoS requirements.

As shown in FIG. 3B, the system identifies the most recent request in the request queue belonging to an oversubscribed IP, in this case, IP0, which is occupying more than its allowed portion of the request queue. The new request 301A (Req 8) from IP1, which is undersubscribed, is accepted and overwrites the selected entry 302A from IP0 (Req 7) in the request queue. To ensure that the overwritten request is not lost, Req 7 is copied to the replay buffer, where it will remain until it can be reintroduced to the request queue when space becomes available.

Accordingly, this process enables dynamic reallocation of queue resources, ensuring that requests from undersubscribed IPs are prioritized while maintaining a record of overwritten requests for future scheduling.

Figure 4:
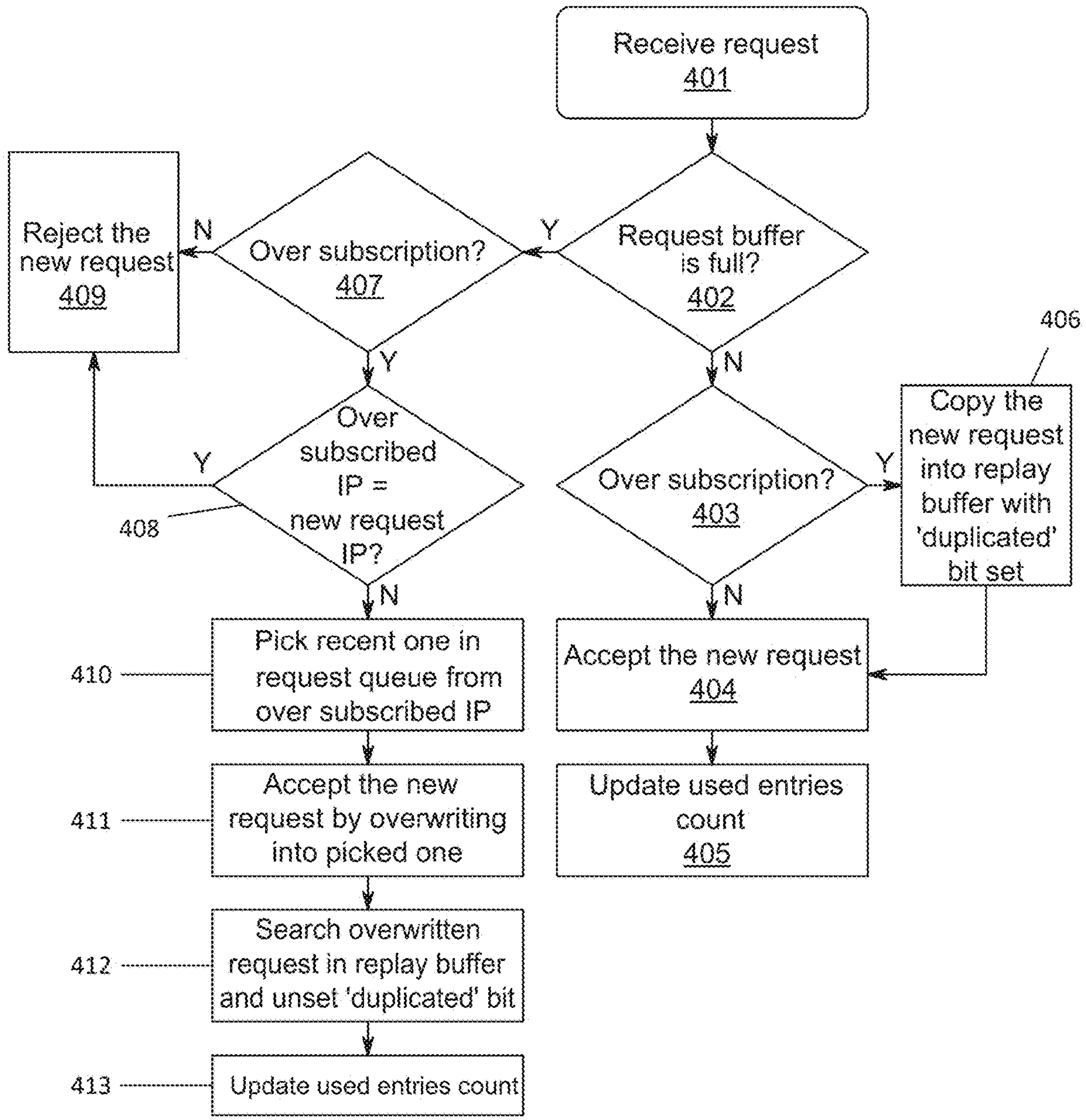
FIG. 4 is a flowchart illustrating a method of sending a request until and after the request queue is full, according to an embodiment.

FIG. 4 is a flowchart illustrating a method of sending a request until and after the request queue is full, according to an embodiment.

Referring to FIG. 4, the flowchart may be performed by an MC. The flowchart illustrates the process of managing memory requests using a request queue and replay buffer, such as those shown in FIGS. 2A-2B and 3A-3B, to optimize bandwidth utilization while maintaining QoS requirements.

In step 401, a new memory request is received by the MC (e.g., Req 4 in FIG. 2A). At step 402, the system checks if the request queue is full. If the request queue is not full, the process proceeds to step 403, where the system determines if the incoming request would cause oversubscription of the IP of the incoming request. This step may include comparing a count of request slots occupied by memory requests associated with the IP to a dedicated number of request slots allocated to that IP, and identifying the memory request as oversubscribed in a case in which the count exceeds the dedicated number of request slots. If there is no oversubscription, the system moves to step 404, where the request is accepted into the queue, and the used entries count is updated in step 405. However, if the incoming request causes oversubscription, then in step 406, the system copies the request into the replay buffer, marking it with a "duplicated" bit to indicate it is stored for future scheduling, the new request is accepted into the queue in step 404, and the used entries count is updated in step 405.

If the request queue is full (e.g., such as the request queue shown in FIG. 3A), as determined in step 402, the process proceeds to step 407, where the system evaluates whether any of the request slots in the request buffer are oversubscribed to an IP. If the request slots are not oversubscribed, then the request is rejected, and the process ends in step 409.

If the one or more request slots are oversubscribed to an IP in step 407, the system evaluates whether the IP of the oversubscribed one or more slots is equivalent to the IP of the incoming (new) request in step 408. If the IP of the oversubscribed one or more slots is equivalent to the new IP request in step 408, then the request is rejected, and the process ends at step 409. If the IP of the oversubscribed one or more slots is not equivalent to the new request IP in step 408, the system moves to step 410, where the most recent request in the request queue from an oversubscribed IP is identified. At step 411, the incoming request is written into the request queue by overwriting the identified request from the oversubscribed IP. To ensure no data is lost, the overwritten request is copied into the replay buffer at step 412, and the "duplicated" bit associated with it is cleared to indicate that it has been removed from the request queue. Finally, the system updates the used entries count at step 413 to reflect the new state of the queue and resource allocation.

Accordingly, by using the replay buffer and management of request queue and replay buffer, the system allows requests from undersubscribed IPs to replace those from oversubscribed IPs, and additionally, the replay buffer ensures that overwritten requests are not lost and can be scheduled in the future, ensuring efficient utilization of queue resources while adhering to QoS requirements.

FIGS. 5A-5D illustrate the operation of a request queue and a replay buffer when a request is released from the request queue, according to an embodiment.

Figure 5A:
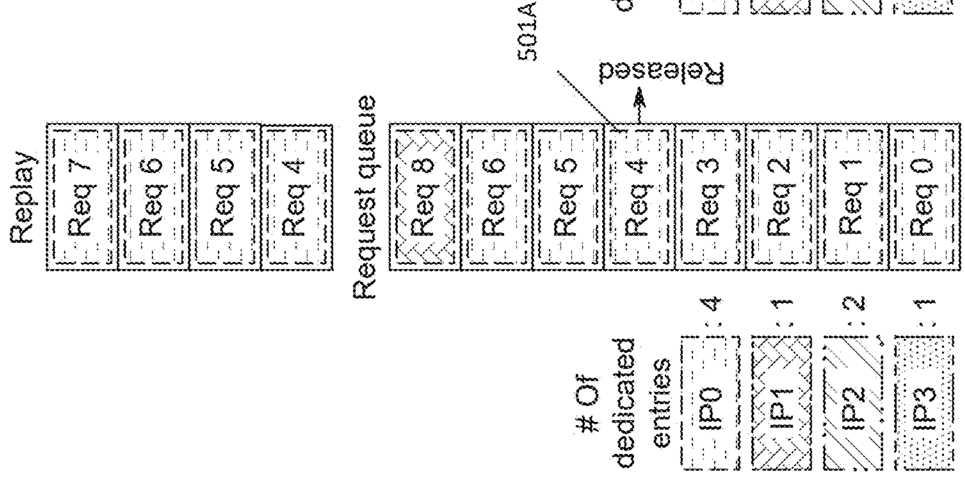
FIGS. 5A-5D illustrate the operation of a request queue and a replay buffer when a request is released from the request queue, according to an embodiment.

Referring to FIG. 5A, the request queue is shown to be at full capacity, with the number of dedicated entries allocated to IPs as follows: 4 entries to IP0, 1 entry to IP1, 2 entries to IP2, and 1 entry to IP3. In this state, a request 501A from IP0, specifically Req 4, is ready to be released after execution of the request has been completed. Once Req 4 is released from the queue, the system moves to reallocate the freed space.

Figure 5B:
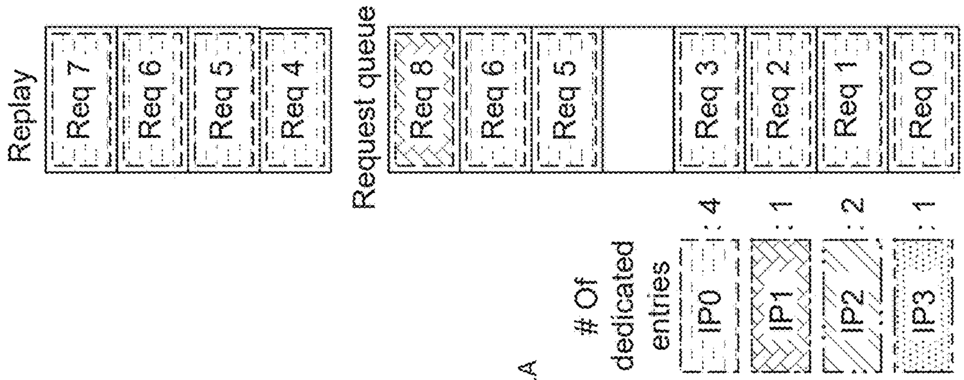

Referring to FIG. 5B, the system checks the replay buffer for the same request (Req 4) to deallocate it. Since Req 4 exists in the replay buffer, it is removed, ensuring synchronization between the replay buffer and the request queue. At this stage, a vacant entry becomes available in the request queue for future requests.

Figure 5C:
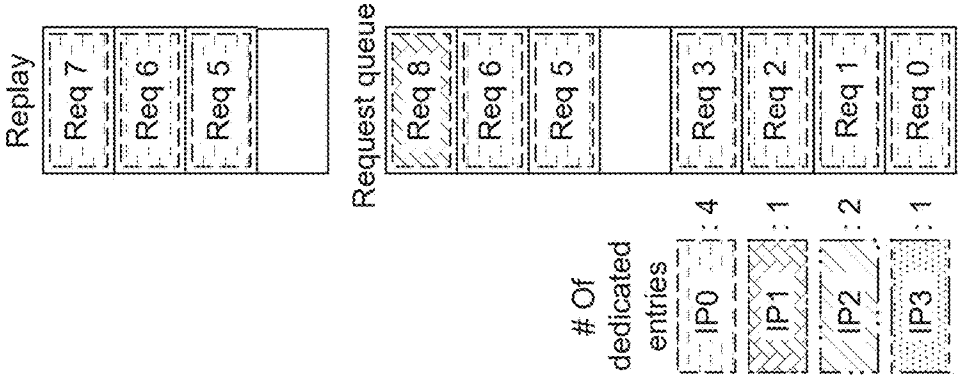

Referring to FIG. 5C, the system identifies the next request in the replay buffer that does not already exist in the request queue. The selected request from the replay buffer, in this case, Req 7, is prepared to be moved back into the request queue. This ensures that all requests stored in the replay buffer are eventually serviced, maintaining the system's commitment to QoS and efficient resource management.

Figure 5D:
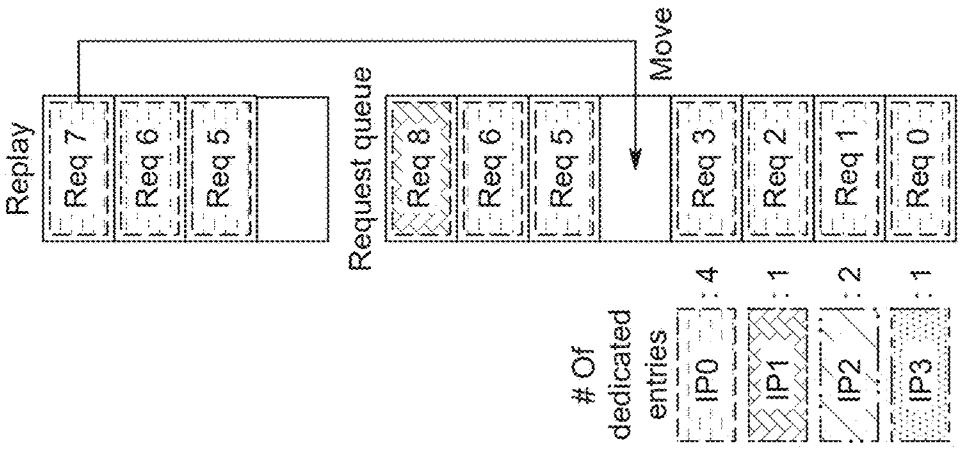

Referring to FIG. 5D, Req 7 is successfully moved from the replay buffer into the newly available entry in the request queue. This process ensures that the request queue is always fully utilized, allowing the MC to maximize bandwidth efficiency while adhering to QoS requirements. The replay buffer is updated accordingly to reflect the removal of Req 7, completing the cycle.

Accordingly, the system may avoid wasting resources and guarantee that no request is lost, all while maintaining efficient operation within the constraints of the MC's design.

Figure 6:
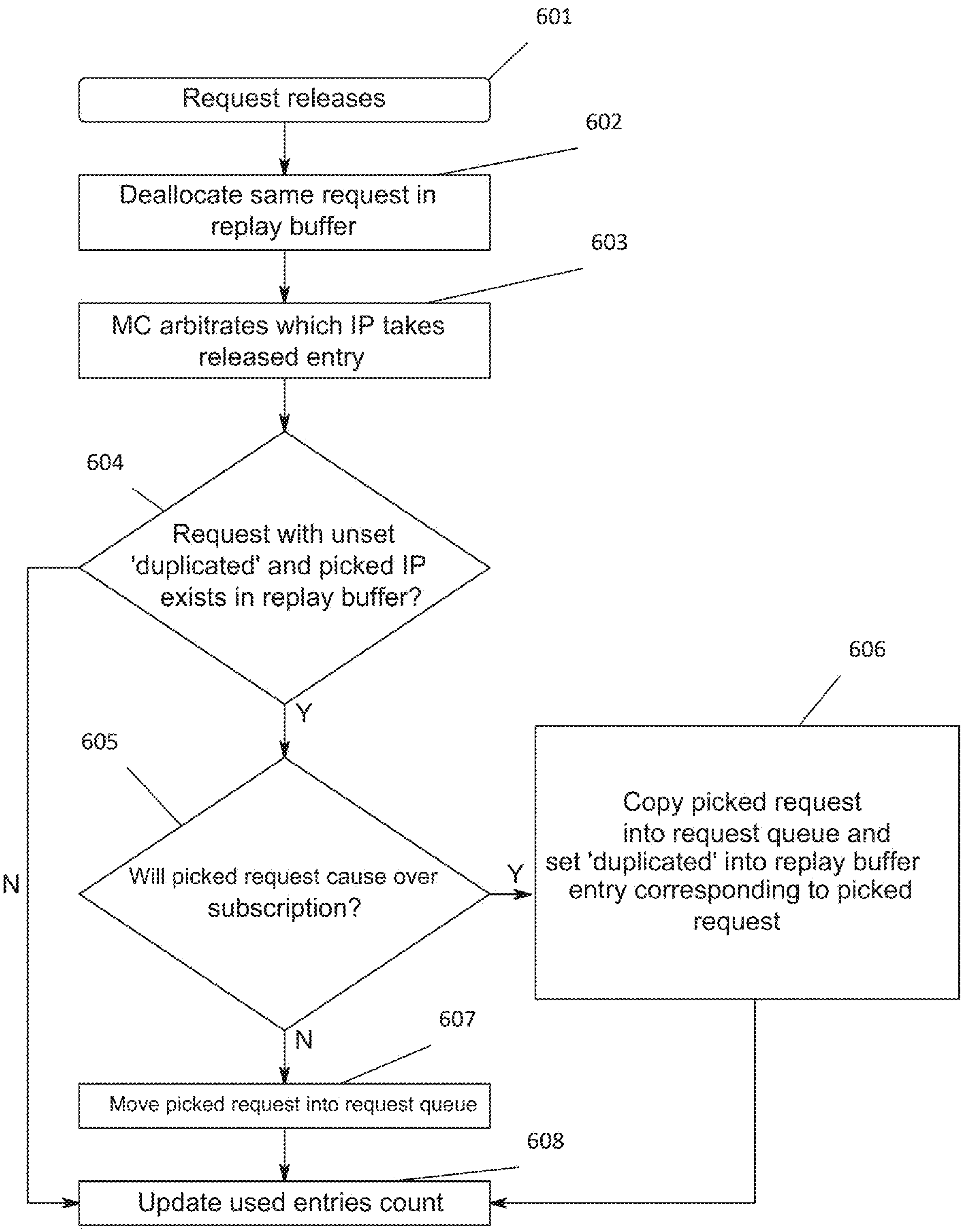
FIG. 6 is a flowchart illustrating a method of releasing a request from the request queue, according to an embodiment.

FIG. 6 is a flowchart illustrating a method of releasing a request from the request queue, according to an embodiment.

Referring to FIG. 6, the flowchart may be performed by an MC or another memory management device. The flowchart illustrates the process for managing requests when a slot in the request queue becomes available, as shown in FIGS. 5A-5D.

In step 601, the process begins when a request in the request queue is executed and released, creating an available slot (e.g., as shown in the request queue of FIG. 5B). The system may then confirm that the same request is in the replay buffer to ensure consistency. After confirmation, the released request is deallocated from the replay buffer in step 602 (e.g., as shown in the replay buffer of FIG. 5C) to prevent duplicates and maintain synchronization between the request queue and the replay buffer.

Following step 602, the MC arbitrates which IP will take the newly available slot in step 603. One example of arbitration may be round-robin arbitration. The arbitration may involve evaluating the state of each IP, including its current usage of allocated request queue entries and the number of active requests, while prioritizing undersubscribed IPs to maximize efficiency. This arbitration may ensure that resources are allocated fairly and in accordance with QoS requirements.

In step 604, the system then evaluates whether there is a pending request in the replay buffer associated with the IP selected in step 603 that meets two criteria: first, the request must not already exist in the request queue, and second, its "duplicated" bit must be unset. If no such request exists, the process ends for the current iteration and the used entries count is updated in step 608.

If an eligible request is identified in step 604, the system evaluates whether adding this request to the request queue will cause oversubscription for the selected IP in step 605. As stated above, oversubscription occurs when an IP exceeds its allocated portion of the request queue, which could disrupt QoS guarantees. If oversubscription would occur, then in step 606, the system copies the request into the request queue while marking its entry in the replay buffer with a "duplicated" bit to keep track of it for future scheduling. However, if no oversubscription would occur, then in step 607, the request is moved from the replay buffer into the available slot in the request queue, ensuring that resources are efficiently utilized without violating allocation limits. Next, in step 608, the system updates the used entries count for the selected IP to reflect the new allocation, ensuring accurate tracking of resource usage. Accordingly, this process dynamically manages requests between the replay buffer and the request queue.

Figure 7:
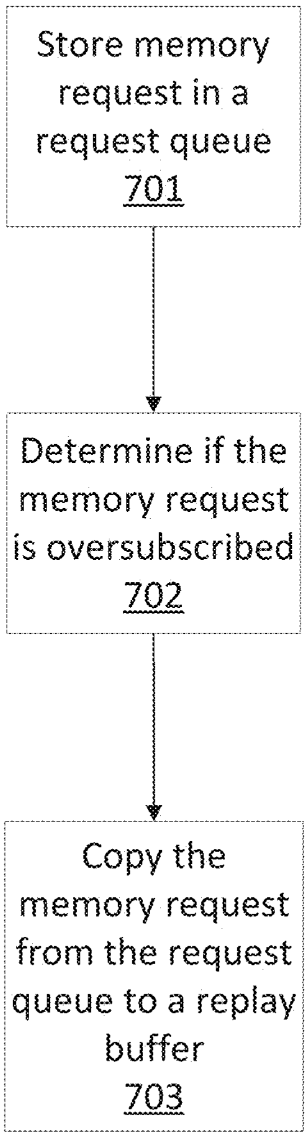
FIG. 7 is a flowchart illustrating a method for managing a request queue in a memory device, according to an embodiment.

FIG. 7 is a flowchart illustrating a method for managing a request queue in a memory device, according to an embodiment.

The method may be implemented by an MC comprising circuitry configured to execute the steps of the method. The circuitry may include a processor and memory to manage operations such as determining oversubscription, allocating request slots, and transferring memory requests between the request queue and replay buffer. The method may be implemented in hardware, software, or a combination thereof.

Referring to FIG. 7, in step 701 a memory request is stored in a request queue. The request queue may include one or more request slots. The request slots may be dynamically allocated to different IPs based on QoS requirements. The memory request may correspond to a read or write operation initiated by an IP, such as a CPU or GPU.

In step 702, it is determined if the memory request in the request queue is oversubscribed to a dedicated number of request slots of a first IP. The determination may involve comparing the number of active requests associated with the first IP to its allocated portion of the request queue. Oversubscription may occur when the number of requests exceeds the allocated slots, which could disrupt QoS guarantees for other VCs or IPs.

In step 703, the memory request is copied from the request queue to a replay buffer in a case in which the memory request is oversubscribed to the first IP. The replay buffer may include one or more replay slots. The replay buffer may be implemented as a CAM to enable fast lookups and retrieval of oversubscribed requests.

Figure 8:
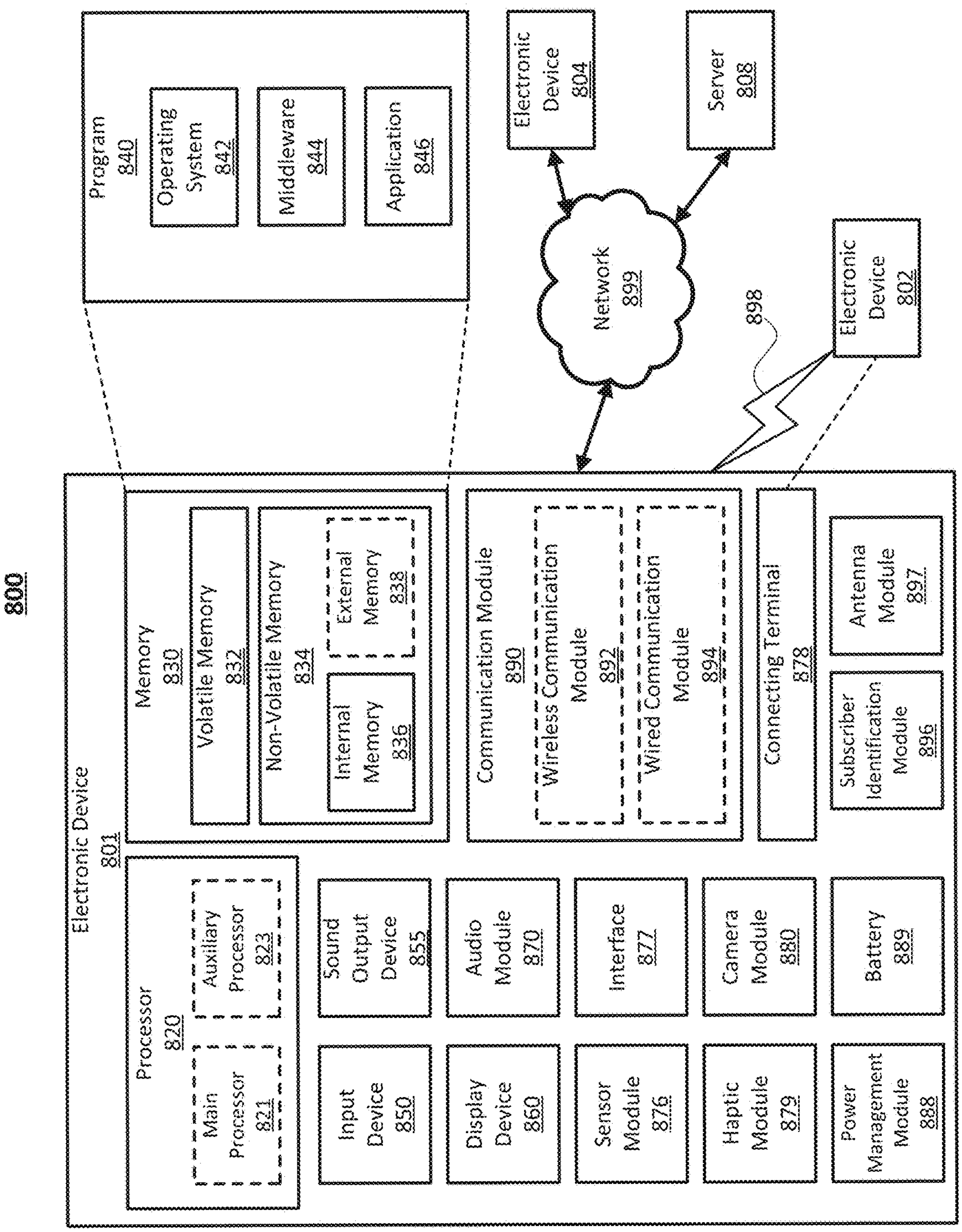
FIG. 8 is a block diagram of an electronic device in a network environment, according to an embodiment.

FIG. 8 is a block diagram of an electronic device in a network environment, according to an embodiment.

Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) card 896, or an antenna module 897. In one embodiment, at least one (e.g., the display device 860 or the camera module 880) of the components may be omitted from the electronic device 801, or one or more other components may be added to the electronic device 801. Some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute software (e.g., a program 840) to control at least one other component (e.g., a hardware or a software component) of the electronic device 801 coupled with the processor 820 and may perform various data processing or computations.

The memory 830 in the electronic device 801 can be used to implement the embodiments of the present disclosure by serving as a storage medium for the request queue and replay buffer. As explained above, the replay buffer may be used to temporarily hold oversubscribing requests from IPs when their allocated portion of the request queue is full. By leveraging the memory 830, the present disclosure introduces solutions that provide efficient management of these memory requests, optimizing bandwidth utilization and maintaining QoS requirements. Additionally, integrating the replay buffer within memory 830 as a CAM allows for rapid lookups and dynamic reallocations.

The processor (controller) 820 may be implemented by circuitry to operate in conjunction with the memory 830 to execute the control logic that implements the functionality of the MC. The processor 820 may dynamically reallocate unused portions of the request queue, move requests between the replay buffer and the queue, and track allocations. These operations may ensure that undersubscribed IPs can utilize idle resources without compromising the allocations of oversubscribed IPs. This dynamic resource management, enabled by the processor 820, results in technological improvements by reducing queuing latency and preventing resource underutilization, while adhering to the constraints of hardware design.

The communication module 890 may facilitate the transmission of memory requests between various components within the device or across devices in the network environment. For example, requests from different IPs (e.g., CPU, GPU, NPU, or other components) can be communicated to the MC via the communication module 890. The replay buffer and request queue management strategy allow for the efficient handling of these requests.

As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a CPU or an application processor (AP)), and an auxiliary processor 823 (e.g., a GPU, an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). The auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834. Non-volatile memory 834 may include internal memory 836 and/or external memory 838.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850 or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high-definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezoelectric element, or an electrical stimulator.

The camera module 880 may capture a still image or moving images. The camera module 880 may include one or more lenses, image sensors, image signal processors, or flashes. The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH$^{TM}$, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Additionally or alternatively, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A memory controller comprising:
a request queue comprising one or more request slots;
a replay buffer comprising one or more replay slots; and
circuitry configured to:
determine a memory request in the request queue is oversubscribed to a dedicated number of the request slots of a first information processor (IP), and
copy the memory request from the request queue to the replay buffer in a case in which the memory request is oversubscribed to the first IP.

2. The memory controller of claim 1, wherein the circuitry is configured to determine the memory request is oversubscribed to the dedicated number of the request slots of the first IP by comparing a count of request slots occupied by memory requests associated with the first IP to the dedicated number of request slots allocated to the first IP.

3. The memory controller of claim 1, wherein the circuitry is further configured to store an incoming memory request in the request queue in a case in which one or more of the request slots are available.

4. The memory controller of claim 1, wherein the circuitry is further configured to overwrite the memory request in the request queue with an incoming memory request.

5. The memory controller of claim 4, wherein the incoming memory request is assigned to a second IP different than the first IP.

6. The memory controller of claim 1, wherein the circuitry is further configured to deallocate a memory request from the replay buffer in a case in which the same memory request is released from the request queue.

7. The memory controller of claim 1, wherein the controller is further configured to move a memory request from the replay buffer to the request queue in a case in which the memory request is not duplicated and space becomes available in the request queue.

8. The memory controller of claim 1, wherein the circuitry is further configured to arbitrate which IP is assigned an available entry in the request queue.

9. The memory controller of claim 1, wherein the request slots are assigned a first number of entries dedicated to the first IP and a second number of entries dedicated to a second IP.

10. The memory controller of claim 1, wherein the replay buffer is implemented as a content-addressable memory (CAM).

11. A method for managing memory requests in a memory controller, the method comprising:

storing a memory request in a request queue, the request queue comprising one or more request slots;

determining the memory request in the request queue is oversubscribed to a dedicated number of the request slots of a first information processor (IP); and copying the memory request from the request queue to a replay buffer comprising one or more replay slots in a case in which the memory request is oversubscribed to the first IP.

12. The method of claim 11, further comprising determining the memory request is oversubscribed to the dedicated number of the request slots of the first IP by comparing a count of request slots occupied by memory requests associated with the first IP to the dedicated number of request slots allocated to the first IP.

13. The method of claim 11, further comprising storing an incoming memory request in the request queue in a case in which one or more of the request slots are available.

14. The method of claim 11, further comprising overwriting the memory request in the request queue with an incoming memory request.

15. The method of claim 14, wherein the incoming memory request is assigned to a second IP different than the first IP.

16. The method of claim 11, further comprising deallocating a memory request from the replay buffer in a case in which the same memory request is released from the request queue.

17. The method of claim 11, further comprising moving a memory request from the replay buffer to the request queue in a case in which the memory request is not duplicated and space becomes available in the request queue.

18. The method of claim 11, further comprising arbitrating which IP is assigned an available entry in the request queue.

19. The method of claim 11, wherein the request slots are assigned a first number of entries dedicated to the first IP and a second number of entries dedicated to a second IP.

20. The method of claim 11, wherein the replay buffer is implemented as a content-addressable memory (CAM).

* * * * *